June 21, 1932.     J. FOTAKIS     1,864,015

COMBINATION REAR VIEW MIRROR SET FOR AUTOMOBILES

Filed April 1, 1930

INVENTOR.
JOHN FOTAKIS,
BY Shepherd & Campbell
ATTORNEYS

Patented June 21, 1932

1,864,015

UNITED STATES PATENT OFFICE

JOHN FOTAKIS, OF DETROIT, MICHIGAN

COMBINATION REAR VIEW MIRROR SET FOR AUTOMOBILES

Application filed April 1, 1930. Serial No. 440,851.

This invention relates to a combination rear view mirror set, for automobiles. Like the mirror set shown in my Patent No. 1,771,251, this invention has for its object to provide a device of simple and economical construction, adapted to give the maximum of desirable results in both day and night driving. The rear view mirrors first employed on automobiles comprised mirrors of ordinary construction, i. e., those having highly reflective backings. While such mirrors were very efficient in daylight driving, they were objectionable for night driving, because they reflected into the eyes of the driver, with full force, the rays from the headlights of following automobiles. To cure the foregoing defect, rear view mirrors have recently been proposed, and are now largely used, having backings of a dark or black material. These latter mirrors are found to very materially cut down the glare from the headlights of following automobiles, while they still yield a fair service as reflecting mediums, in daylight. However, they are nowhere near as efficient as rear vision mirrors as the mirrors having the highly reflective backings.

It is the purpose of the present invention to provide a structure having the advantages of the highly reflective mirrors for daylight driving, and the advantages of the so-called "dark" mirrors for night driving.

It is a further object of the invention to provide a mirror set of the character indicated, comprising improved means for effecting the adjustment of the mirrors in both horizontal and vertical planes. The principal point of difference over my patent, above referred to, is in the adjustment of the mirror in a vertical plane, the arrangement being such that the driver need not exercise great care in moving the mirror, but, upon the contrary, can, without taking his eyes from the road, adjust the mirror to the proper angle, to bring the rear window of the automobile, and, consequently, the road behind, within his range of vision, as viewed in the mirror.

This is accomplished by providing a settable stop mechanism, which tends to bring the turning movement of the mirror to an end when the mirror has reached a given point. This stop mechanism is made readily settable, so that it may be adjusted to fit the existing conditions, as determined by the particular automobile upon which the device is used, or by the height of the driver using the same, in any given moment. It is frequently the case that different members of the family drive the family automobile in succession, and people of different heights require different settings on the mirror. Furthermore, the proportions of the automobile upon which the mirror is used has a further bearing in determining the angle at which the mirror should be set, in order to properly reflect the road behind.

The device of the present invention is intended to adapt itself to meet the requirements of these varying conditions.

In the accompanying drawing.

Like numerals designate corresponding parts in all of the figures of the drawing.

Figure 1:
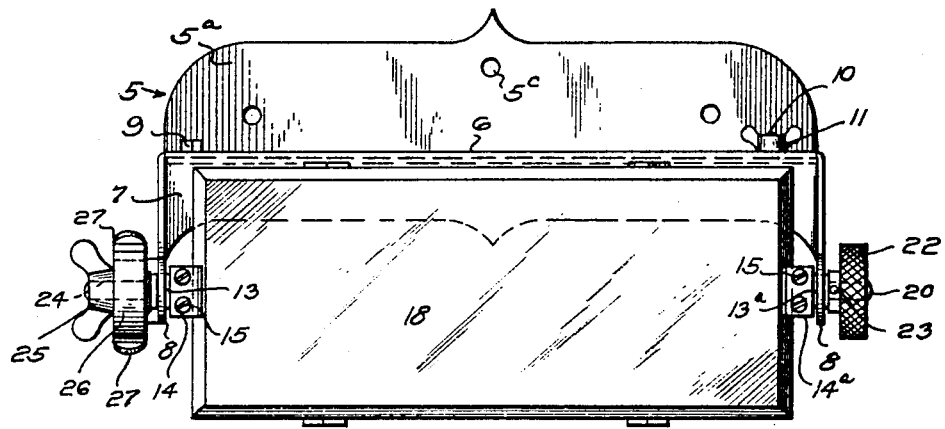
Fig. 1 is a front elevation of a mirror set, in accordance with the invention.
Figure 2:
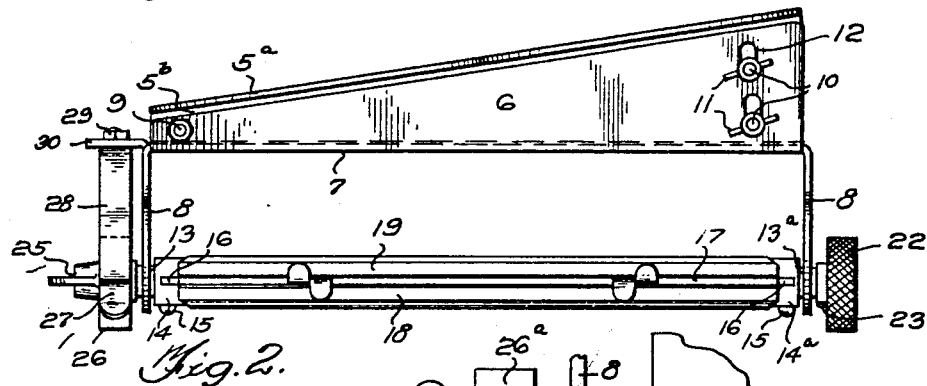
Fig. 2 is a plan view thereof.
Figure 5:
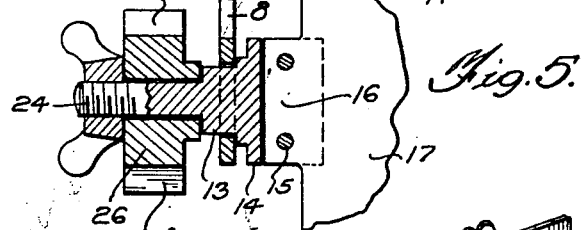
Fig. 5 is a detail sectional view through the left hand trunnion.
Figure 3:
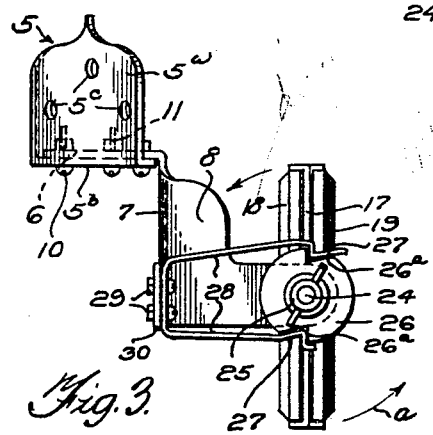
Fig. 3 is an end elevation thereof.
Figure 4:
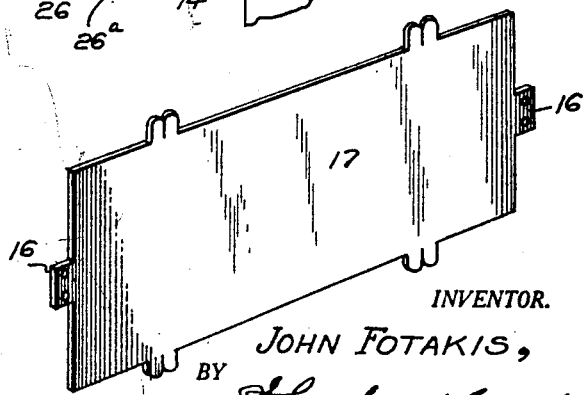
Fig. 4 is a detail view of a trunnion plate, hereinafter described.

Referring to the drawing, 5 designates a bracket, comprising the vertical wall $5^a$, and the horizontal wall $5^b$. The vertical wall $5^a$ is adapted to be secured in position upon the automobile, above the glass of the windshield, and inwardly thereof, in the usual and well known way, by screws, (not shown), which pass through openings $5^c$, of the vertical wall $5^a$. Thus, the bracket 5 constitutes a fixed bracket. A movable bracket, of L-shaped in cross section, comprising a horizontal wall 6, vertical wall 7, and forwardly projecting end flanges 8, is mounted for horizontal adjustment upon the wall $5^b$, by means of a pivot bolt 9 and binding screws 10, the latter being provided with thumb nuts 11. The screws 10 pass through the wall $5^b$, and through arcuate slots 12, of the wall 6, and, thus, the moveable bracket may be adjusted horizontally about the pivot bolt 9 to vary the angle of the mirrors, transversely of the automobile, so that the reflection of the rear window of the automobile, and, consequently, the reflection of the road in the rear thereof, may be accurately positioned in said mirrors. The forwardly projecting, depending ears 8 serve as a point of mounting for the round portions 13—13ª of the trunnion blocks 14—14ª, and these blocks are, in turn, secured by screws 15 to end extensions 16, of a flat plate 17, which lies between the two mirror sections 18 and 19, one of which constitutes a bright or day mirror, and the other of which constitutes a night or dark mirror. A reduced extension 20 of the trunnion block 14ª carries a thumb piece 22, which is held thereon by a set screw 23. A reduced extension 24 of the trunnion block 14, carries a thumb nut 25, and by tightening this thumb nut, a ratchet disc 26 may be bound against the end of the round portion 13, of said trunnion block. Thus, by loosening the thumb nut 25, the ratchet disc 26 may be adjusted around the reduced portion 24, and thus, the position of its ratchet notches 26ª may be varied to any desired extent, with respect to the position of the mirror sections 18 and 19. Pawls 27, that are carried by the terminal end portions of a flat spring 28, the intermediate portions of which are secured by screws 29, to an extension 30 of the vertical wall 7, engage in the ratchet notches. By manipulating the thumb piece 22, the two mirrors may be turned about the axis provided by the trunnions in the direction indicated by the arrow a, and when the mirrors have reach the position for which the ratchet disc has been set, the operator will be appraised of that fact by the snapping of the pawls 27 into the notches, and by the tendency of the mirrors to come to a stop. If the day mirror has been in use, and it is desired to use the night mirror, it is only necessary to give said mirrors a heavy revolution, at the end of which the pawls will be automatically brought to a stop, in the proper position. It will be seen that this may be done with the automobile in motion, and without requiring the operator to take his eyes from the road.

It will further be seen that the means for changing the setting of the mirrors is an extremely simple one, operable by the fingers and without the use of special tools, and without requiring the operator to leave the driver's seat. That is to say, this adjustment may be effected with the driver sitting in the driver's seat, where he can easily determine when the mirror has been moved to the proper degree to suit his particular height.

It will be observed that the trunnion blocks 16 are shaped to engage over the bevel edges of the mirrors, and I may, if desired, provide lugs upon the edges of the plate 17 to further engage over the edges of the mirrors, or I may cement, or otherwise, secure the mirrors to said plate, or I may rely upon the trunnion blocks alone, to hold the mirrors, cementing said glasses directly back to back.

While the arrangement shown and described is a simple and economical one, it is to be understood that the invention includes not only the particular arrangement shown, but any equivalent arrangement fairly coming within either the terms or the spirit of the appended claims.

Having described my invention, what I claim is:

1. The combination with a frame, of means for adjusting the same in a horizontal plane to vary the positions of angularity a mirror set horizontally trunnioned in said frame, and means for automatically stopping the turning movement of the mirror set at two predetermined points diametrically opposite each other, said means comprising a disc notched at two points and carried by a trunnion of the mirror set and a pair of pawls carried by the frame and engaging the notches of said discs upon opposite sides thereof.

2. A structure as recited in claim 1, in combination with means for adjusting the point at which the checking of the turning movement of the mirror set will be effected.

3. The combination with a supporting frame, comprising a pair of forwardly projecting arms, of trunnions journaled therein, a thumb piece engaged with one of said trunnions for turning the same, a ratchet disc engaged with the other of said trunnions, pawls engaging said ratchet disc, and means for adjusting the position of the ratchet disc circumferentially with respect to its trunnion.

4. The combination with a support, comprising forwardly projecting arms, a mirror set, a pair of trunnions supporting the said mirror set and journaled in said arms, a ratchet disc mounted upon one of said trunnions pawls engaging said ratchet disc, and means for binding the ratchet disc in varying positions with respect to said trunnions to cause said ratchet disc to turn with the trunnions.

5. A structure of the characer described, comprising a pair of mirrors, facing in opposite directions, a plate disposed between said mirrors, a pair of trunnion blocks engaging over the edges of said mirrors, and end extensions upon said plate, engaged with said trunnion blocks.

6. A device of the character described, consisting of a fixed support, comprising a horizontally disposed plate, a movable supporting element pivoted to the horizontally disposed plate and adjustable to varying positions of angularity with respect thereto, and comprising forwardly projecting arms, a pair of trunnion blocks comprising round portions journaled in said arms, recessed inner portions and reduced outer extensions, a pair of mirrors having beveled end portions which are disposed in the recessed portions of the trunnion block, a plate disposed between said mirrors and having end extensions projecting into said trunnion blocks, fastening devices traversing the trunnion blocks and the end extensions of the plate, a thumb piece secured upon the reduced end extension of one of the trunnion blocks, a ratchet disc mounted to turn upon the reduced end extension of the other of the trunnion blocks, and a thumb nut threaded upon the last named extension and adapted to bind the ratchet disc in varying positions of adjustment with respect to said extension.

7. A device of the character described, comprising an angularly adjustable frame, forwardly projecting arms at the opposite ends thereof, a mirror set comprising a light and dark mirror and a metallic plate extending between said mirrors and substantially co-extensive therewith, said plate being provided with lugs upon its upper and lower edges which are bent over said mirrors and said plate being further provided with centrally disposed integral end extensions, trunnions secured to said end extensions and mounted to turn in said forwardly projecting arms a thumb piece upon the outer end of one of said trunnions and a pawl and ratchet mechanism between one of said trunnions and a portion of the frame, as and for the purposes set forth.

8. A structure as recited in claim 7 wherein the pawl and ratchet mechanism comprises a disc upon said trunnion which is peripherally notched at diametrically opposite points and spring arms constituting pawls projecting forwardly from said frame and engaging the notches of the disc upon opposite sides thereof.

In testimony whereof I affix my signature.
JOHN FOTAKIS.